(12) United States Patent
Jung et al.

(10) Patent No.: US 12,284,235 B2
(45) Date of Patent: Apr. 22, 2025

(54) HYBRID DOWNLOAD METHOD AND APPARATUS FOR MULTIVIEW STREAMING, AND MULTIVIEW STREAMING SYSTEM

(71) Applicant: ELECTRONICS AND TELECOMMUNICATIONS RESEARCH INSTITUTE, Daejeon (KR)

(72) Inventors: Joon-Young Jung, Daejeon (KR); Je-Won Lee, Daejeon (KR); Dong-Joon Choi, Daejeon (KR); Eun-Hee Hyun, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 18/503,612

(22) Filed: Nov. 7, 2023

(65) Prior Publication Data

US 2024/0155014 A1 May 9, 2024

(30) Foreign Application Priority Data

Nov. 8, 2022 (KR) .................. 10-2022-0147618

(51) Int. Cl.
*H04L 65/61* (2022.01)
*H04N 21/218* (2011.01)

(52) U.S. Cl.
CPC ....... *H04L 65/61* (2022.05); *H04N 21/21805* (2013.01)

(58) Field of Classification Search
CPC . H04L 65/61; H04L 65/612; H04N 21/21805; H04N 21/6587; H04N 21/816; H04N 21/8456; H04N 13/117; H04N 13/194; H04N 21/2393; H04N 21/44218
USPC .......................................................... 709/224
See application file for complete search history.

(56) References Cited

U.S. PATENT DOCUMENTS

| | | |
|---|---|---|
| 9,544,619 B2 | 1/2017 | Kim et al. |
| 11,405,599 B2 | 8/2022 | Lee et al. |
| 11,575,871 B2 | 2/2023 | Jeong et al. |
| 2016/0191895 A1 | 6/2016 | Yun |

FOREIGN PATENT DOCUMENTS

| | | |
|---|---|---|
| KR | 10-1350915 B1 | 2/2014 |
| KR | 10-1399951 B1 | 6/2014 |
| KR | 10-2015-0061459 A | 6/2015 |

(Continued)

*Primary Examiner* — Karen C Tang
(74) *Attorney, Agent, or Firm* — NSIP Law (57) ABSTRACT

Disclosed herein are a hybrid download method and apparatus for multiview streaming. The hybrid download method includes requesting a group download for an n−1-th segment from a server, playing an n−3-th segment at a viewpoint VP1 of a viewer, when a group download request for the n−1-th segment is completed, making a group download request for an n-th segment, when a change in a viewpoint of the viewer occurs at a time at which an n−2-th segment is played, playing a low-quality n−2-th segment at a viewpoint VP3, when the group download for the n-th segment is completed, requesting a single download for a high-quality n−1-th segment corresponding to the viewpoint VP3 from the server, and when the single download for the high-quality n−1-th segment corresponding to the viewpoint VP3 is completed, playing the high-quality n−1-th segment at the viewpoint VP3.

18 Claims, 4 Drawing Sheets

(56) References Cited

FOREIGN PATENT DOCUMENTS

| KR | 10-2020-0076529 A | 6/2020 |
|----|-------------------|--------|
| KR | 10-2356037 B1     | 2/2022 |
| KR | 10-2022-0075538 A | 6/2022 |

HYBRID DOWNLOAD METHOD AND APPARATUS FOR MULTIVIEW STREAMING, AND MULTIVIEW STREAMING SYSTEM

CROSS REFERENCE TO RELATED APPLICATION

This application claims the benefit of Korean Patent Application No. 10-2022-0147618, filed on Nov. 8, 2022, which is hereby incorporated by reference in its entirety into this application.

BACKGROUND OF THE INVENTION

1. Technical Field

The present disclosure relates generally to a method and an apparatus which provide a service in high-video quality without causing a delay in viewpoint transition depending on the change in the viewpoint of a viewer in multiview video streaming.

2. Description of the Related Art

Recently, various types of immersive content such as three-dimensional television (3DTV), multiview, 360 virtual reality (VR), and augmented reality (AR) content have been evolving into forms in which a video service is provided through access to the Internet. In the case of the immersive content, the amount of data to be transmitted is large to make it difficult to provide a service on the Internet, but the range of service has more and more expanded due to the rapid progress of video/audio compression technology and content transmission technology.

When a service for such immersive content is provided on the Internet, the most crucial point is to ensure smooth interaction with viewers. The term "smooth interaction" in immersive content denotes enabling an immersive response to the specific request of a viewer. Generally, in an environment in which immersive content is present in a local area, it is possible to immediately respond to the request of a viewer, whereas in an environment in which content is present at a remote place and is received over a network, it is difficult to immediately respond to the request of the viewer due to a transmission delay.

In particular, in the case of a multiview video (or image), when the viewpoint of the viewer is moved while the viewer is watching the video, the multiview video needs to be played after the video to be played has switched to the video corresponding to the moved viewpoint. However, there are transmission delays occurring on the network, decoding delays occurring when playing compressed videos, etc., thus making it difficult for the viewers to immediately watch videos corresponding to desired viewpoints without causing any delays.

SUMMARY OF THE INVENTION

Accordingly, the present disclosure has been made keeping in mind the above problems occurring in the prior art, and an object of the present disclosure is to provide a hybrid download method and apparatus for multiview streaming and a multiview streaming system, which play videos by immediately moving to the corresponding viewpoint in response to the change in the viewpoint of a viewer.

Another object of the present disclosure is to provide a hybrid download method and apparatus for multiview streaming and a multiview streaming system, which can minimize the waste of a band while maximally satisfying a user's viewing experience.

In accordance with an aspect of the present disclosure to accomplish the above objects, there is provided a hybrid download method for multiview streaming, including requesting a group download for an n−1-th segment from a server, playing an n−3-th segment at a viewpoint VP1 of a viewer, when a group download request for the n−1-th segment is completed, making a group download request for an n-th segment, when a change in a viewpoint of the viewer occurs at a time at which an n−2-th segment is played, playing a low-quality n−2-th segment at a viewpoint VP3, when the group download for the n-th segment is completed, requesting a single download for a high-quality n−1-th segment corresponding to the viewpoint VP3 from the server, and when the single download for the high-quality n−1-th segment corresponding to the viewpoint VP3 is completed, playing the high-quality n−1-th segment at the viewpoint VP3.

The hybrid download method may further include requesting a single download for a high-quality n-th segment corresponding to the viewpoint VP3 from the server.

The hybrid download method may further include, when the single download for the high-quality n-th segment corresponding to the viewpoint VP3 is completed, requesting a group download for a high-quality n+1-th segment corresponding to the viewpoint VP3 from the server.

The hybrid download method may further include playing the high-quality n-th segment at the viewpoint VP3.

The hybrid download method may further include completing the group download for the high-quality n+1-th segment corresponding to the viewpoint VP3.

When the viewpoint of the viewer is VP1, the viewpoint VP1 may correspond to high quality, and other viewpoints may correspond to low quality.

In accordance with another aspect of the present disclosure to accomplish the above objects, there is provided a hybrid download apparatus for multiview streaming, including memory configured to store a control program for a hybrid download for multiview streaming, and a processor configured to execute the control program stored in the memory, wherein the processor is configured to request a group download for an n−1-th segment from a server, play an n−3-th segment at a viewpoint VP1 of a viewer, when a group download request for the n−1-th segment is completed, make a group download request for an n-th segment, when a change in a viewpoint of the viewer occurs at a time at which an n−2-th segment is played, play a low-quality n−2-th segment at a viewpoint VP3, when the group download for the n-th segment is completed, request a single download for a high-quality n−1-th segment corresponding to the viewpoint VP3 from the server, and when the single download for the high-quality n−1-th segment corresponding to the viewpoint VP3 is completed, play the high-quality n−1-th segment at the viewpoint VP3.

The processor may be configured to request a single download for a high-quality n-th segment corresponding to the viewpoint VP3 from the server.

The processor may be configured to, when the single download for the high-quality n-th segment corresponding to the viewpoint VP3 is completed, request a group download for a high-quality n+1-th segment corresponding to the viewpoint VP3 from the server.

The processor may be configured to play the high-quality n-th segment at the viewpoint VP3.

The processor may be configured to complete the group download for the high-quality n+1-th segment corresponding to the viewpoint VP3.

When the viewpoint of the viewer is VP1, the viewpoint VP1 may correspond to high quality, and other viewpoints may correspond to low quality.

In accordance with a further aspect of the present disclosure to accomplish the above objects, there is provided a multiview streaming system, including a client configured to request a segment group download and a segment single download, and a server configured to transmit a segment group and a single segment in response to the request, wherein the client is configured to request a group download for an n−1-th segment from a server, play an n−3-th segment at a viewpoint VP1 of a viewer, when a group download request for the n−1-th segment is completed, make a group download request for an n-th segment, when a change in a viewpoint of the viewer occurs at a time at which an n−2-th segment is played, play a low-quality n−2-th segment at a viewpoint VP3, when the group download for the n-th segment is completed, request a single download for a high-quality n−1-th segment corresponding to the viewpoint VP3 from the server, and when the single download for the high-quality n−1-th segment corresponding to the viewpoint VP3 is completed, play the high-quality n−1-th segment at the viewpoint VP3.

The client may be configured to request a single download for a high-quality n-th segment corresponding to the viewpoint VP3 from the server.

The client may be configured to, when the single download for the high-quality n-th segment corresponding to the viewpoint VP3 is completed, request a group download for a high-quality n+1-th segment corresponding to the viewpoint VP3 from the server.

The client may be configured to play the high-quality n-th segment at the viewpoint VP3.

The client may be configured to complete the group download for the high-quality n+1-th segment corresponding to the viewpoint VP3.

When the viewpoint of the viewer is VP1, the viewpoint VP1 may correspond to high quality, and other viewpoints may correspond to low quality.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF THE PREFERRED EMBODIMENTS

Advantages and features of the present disclosure and methods for achieving the same will be clarified with reference to embodiments described later in detail together with the accompanying drawings. However, the present disclosure is capable of being implemented in various forms, and is not limited to the embodiments described later, and these embodiments are provided so that this disclosure will be thorough and complete and will fully convey the scope of the present disclosure to those skilled in the art. The present disclosure should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present disclosure.

The terms used in the present specification are merely used to describe embodiments, and are not intended to limit the present disclosure. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

Unless differently defined, all terms used in the present specification can be construed as having the same meanings as terms generally understood by those skilled in the art to which the present disclosure pertains. Further, terms defined in generally used dictionaries are not to be interpreted as having ideal or excessively formal meanings unless they are definitely defined in the present specification.

In the present specification, each of phrases such as "A or B", "at least one of A and B", "at least one of A or B", "A, B, or C", "at least one of A, B, and C", and "at least one of A, B, or C" may include any one of the items enumerated together in the corresponding phrase, among the phrases, or all possible combinations thereof.

Embodiments of the present disclosure will now be described in detail with reference to the accompanying drawings. Like numerals refer to like elements throughout, and overlapping descriptions will be omitted.

Figure 1:
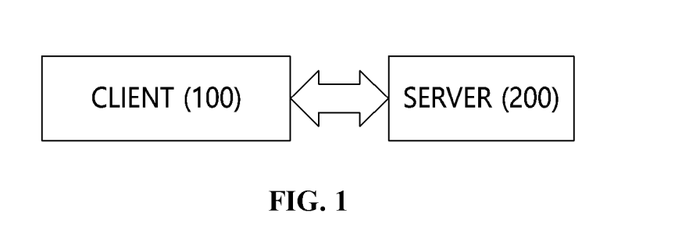
FIG. 1 is a block diagram illustrating a multiview streaming system according to an embodiment.

FIG. 1 is a block diagram illustrating a multiview streaming system according to an embodiment.

As illustrated in FIG. 1, the multiview streaming system according to the embodiment may include a client 100 and a server 200.

The client 100 may include a buffer (not illustrated). Segments corresponding to all view (viewpoints) may be stored in the buffer, and a certain number of segments may be stored for one viewpoint. The client 100 may request a segment group download and a segment single download from the server 200 so as to provide a high-quality video to a user. The client 100 may be a hybrid download apparatus for multiview streaming. The client 100 may be a receiving terminal.

The server 200 may provide a segment group and a single segment to the client 100 in response to the request of the client 100.

Figure 2:
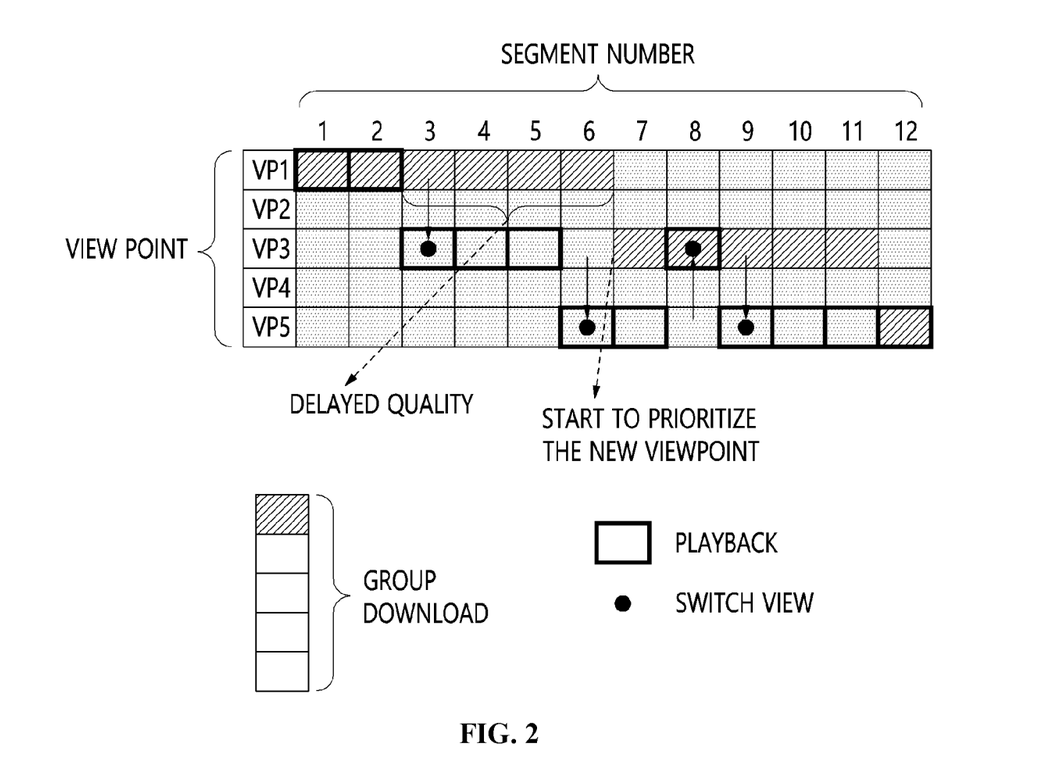
FIG. 2 is a diagram illustrating a multiview streaming download method according to a first embodiment.

FIG. 2 is a diagram illustrating a multiview streaming download method according to a first embodiment.

FIG. 2 shows a group download of downloading segments corresponding to all viewpoints stored in the buffer of a client. The term "group download" may refer to a process of downloading a high-quality video for a viewpoint at which a viewer is currently watching the video and downloading low-quality videos for the remaining viewpoints. Here, the embodiment represents the case where five independent viewpoint videos are provided.

For example, when the viewer is currently watching a video at a viewpoint VP1, the case where segments of a high definition (HD)-level video corresponding to the viewpoint VP1 and segments of standard definition (SD)-level videos corresponding to the remaining viewpoints VP2, VP3, VP4, and VP5 are downloaded may be taken into consideration. This shows that, when the viewpoint of the viewer is moved, a pre-downloaded low-quality video corresponding to the moved viewpoint may be immediately played, thus preventing a delay in the viewpoint change from occurring. However, a quality delay in which, after all pre-downloaded low-quality segments are played at the changed viewpoint, video quality switches to high quality may occur.

Hereinafter, the process of performing a group segment download scheme will be described. Here, the group segment download scheme may be performed by the client (or a receiving terminal).

First, while the viewer is watching a video at the initial viewpoint VP1, the viewpoint is moving to the viewpoint VP3 at the time at which a third segment is played. In this case, in the buffer of the receiving terminal, the download of segments up to a sixth segment has been completed for all viewpoints, and the third segment is played at the viewpoint VP3 without causing a delay, as the viewpoint has moved.

However, although the segments corresponding to the viewpoint VP1, which are downloaded in the buffer of the receiving terminal, have high quality, segments corresponding to the remaining viewpoints VP2, VP3, VP4, and VP5 have low quality. Therefore, after the viewpoint has moved to VP3, pre-downloaded segments up to the sixth segment are watched with low quality. The reason for this is that pre-downloaded segments are not removed, and a group download is performed from the next segment, as described above. Therefore, for segments from a seventh segment, high-quality segments are downloaded for the viewpoint VP3, and low-quality segments are downloaded for the remaining viewpoints.

Next, a viewpoint change from VP3 to VP5 occurs at the time at which a sixth segment is played. At this time, a download of segments up to eleventh segments corresponding to all viewpoints into the buffer of the receiving terminal has been completed, and downloaded low-quality segments at the viewpoint VP5 are played immediately, similar to that of the above description. In this case, high-quality segments from a twelfth segment are downloaded for the viewpoint VP5, and low-quality segments are downloaded for the remaining viewpoints.

Next, a viewpoint change from VP5 to VP3 occurs at the time at which an eighth segment is played. At this time, the receiving terminal immediately plays pre-downloaded high-quality segments at the viewpoint VP3. This shows that the buffer for the pre-downloaded segments is not emptied, thus enabling high-quality segments to be played at the viewpoint VP3 without consuming an additional band.

Finally, a viewpoint change from VP3 to VP5 occurs at the time at which a ninth segment is played. Here, after a low-quality ninth segment at the viewpoint VP5, which is downloaded into the buffer of the receiving terminal, is immediately played, high-quality segments from an twelfth segment are played.

In this way, the group segment download of FIG. 2 is advantageous in that there is no delay in viewpoint transition playback attributable to the change of the viewpoint, but there is a disadvantage in that a considerably long delay occurs when the playback quality switches from low quality to high quality. In order to overcome this disadvantage, the present disclosure additionally proposes a hybrid segment download scheme.

Figure 3:
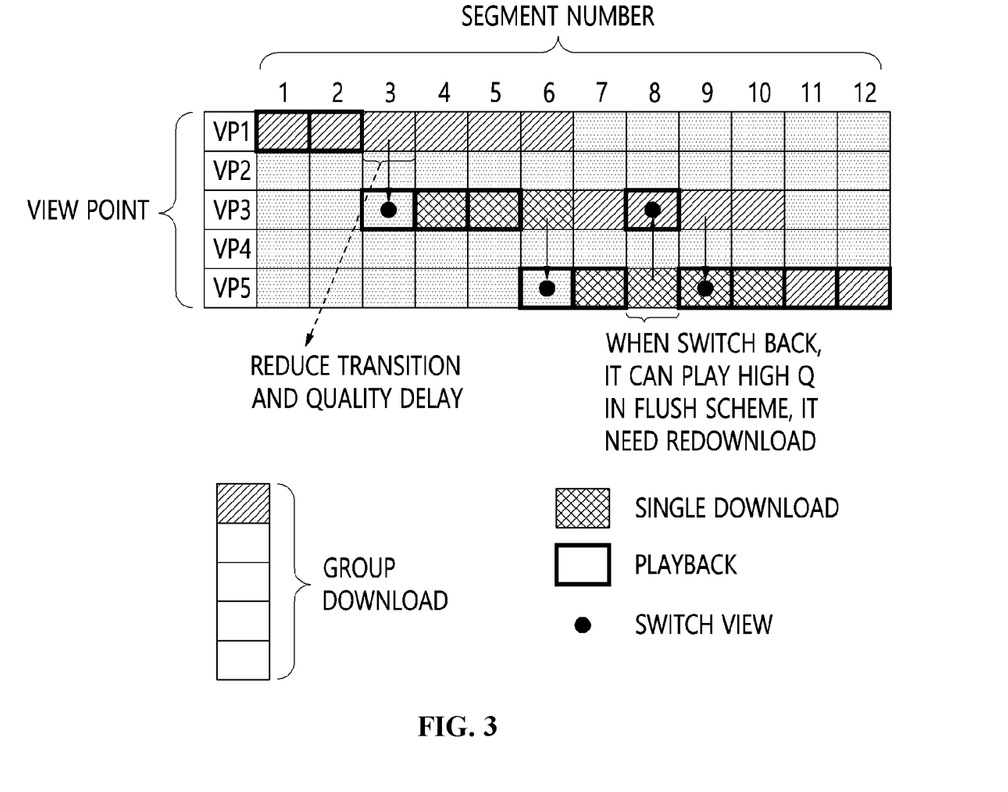
FIG. 3 is a diagram illustrating a hybrid download method for multiview streaming according to a second embodiment.

FIG. 3 is a diagram illustrating a hybrid download method for multiview streaming according to a second embodiment.

First, FIG. 3 may assume a streaming service for five viewpoints, and the hybrid download method for multiview streaming may be performed by a client.

As illustrated in FIG. 3, a hybrid download scheme (also referred to as a "hybrid segment download scheme") according to the embodiment refers to a scheme in which a group download method for downloading segments corresponding to all viewpoints, described in FIG. 2, and a single download method for downloading only video segments corresponding to one viewpoint are applied in combination. In the group download method, when the viewpoint of a viewer is moved, segments at the corresponding viewpoint, which are pre-downloaded, may be immediately played, and thus a delay attributable to the viewpoint change does not occur. However, a quality delay in which, after all pre-downloaded low-quality segments are played at the changed viewpoint, video quality switches to high quality occurs.

The hybrid download scheme is performed such that, in the case where the viewpoint of a user is moved after the group download is performed, when a high-quality segment corresponding to the moved viewpoint is not present in the buffer, a single download of downloading a high-quality segment only for the corresponding viewpoint is performed, and then a group download from the segments for which the group download has been previously completed is performed.

Hereinafter, a process of a hybrid segment download scheme will be described.

First, while a viewer is watching a video at an initial viewpoint VP1, the viewpoint is moving to a viewpoint VP3 at the time at which a third segment is played. In this case, in the buffer of the receiving terminal, a group download of segments up to a sixth segment has been completed for all viewpoints. As the viewpoint moves, a low-quality third segment is played at the viewpoint VP3 without causing a delay at the same time that a single download of downloading a high-quality segment from a fourth segment at the viewpoint VP3 is performed.

The single download is performed up to the sixth segment for which the group download has been completed, after which a group download of downloading high-quality segments corresponding to the viewpoint VP3 is performed from a seventh segment. In this way, segments from the fourth segment may be watched with high quality. A quality delay time in which video quality switches to high quality in the group download in the example of FIG. 2 may be greatly reduced.

Next, a viewpoint change from VP3 to VP5 occurs at the time at which the sixth segment is played. Here, in the buffer of the receiving terminal, a group download of segments up to the sixth segment corresponding to the viewpoint VP1 and a single download of segments up to the sixth segment corresponding to the viewpoint VP3 are performed, and a group download of segments up to a tenth segment corresponding to the viewpoint VP3 has been completed. With respect to the viewpoint change, a pre-downloaded low-quality segment at the viewpoint VP5 is immediately played at the same time that high-quality segments from the seventh segment at the viewpoint VP5 are downloaded through a single download.

The single download is performed up to the tenth segment for which the group download has been completed, after which a group download of downloading high-quality segments at the viewpoint VP5 is performed from an eleventh segment.

Next, a viewpoint change from VP5 to VP3 occurs at the time at which an eighth segment is played. Here, the buffer of the receiving terminal is in the state in which a group download of segments up to the tenth segment corresponding to the viewpoint VP3 and a single download of segments up to the tenth segment corresponding to the viewpoint VP5 have been performed and in which a group download of segments from the eleventh segment corresponding to the viewpoint VP5 has started. Therefore, the receiving terminal immediately plays high-quality segments, pre-downloaded through the group download, at the viewpoint VP3. In this case, because the high-quality segments at the viewpoint VP3 are already present, a single download is not performed.

Finally, a viewpoint change from VP3 to VP5 occurs at the time at which a ninth segment is played. Even in this case, in the same manner as the above-described situation, in the buffer of the receiving terminal, a group download of segments up to the tenth segment corresponding to the viewpoint VP3 and a single download of segments up to the tenth segment corresponding to the viewpoint VP5 are completed. Therefore, the receiving terminal immediately plays high-quality segments, pre-downloaded through the single download, at the viewpoint VP5. Even in this case, because the high-quality segments corresponding to the viewpoint VP5 are already present, a single download is not performed.

Figure 4:
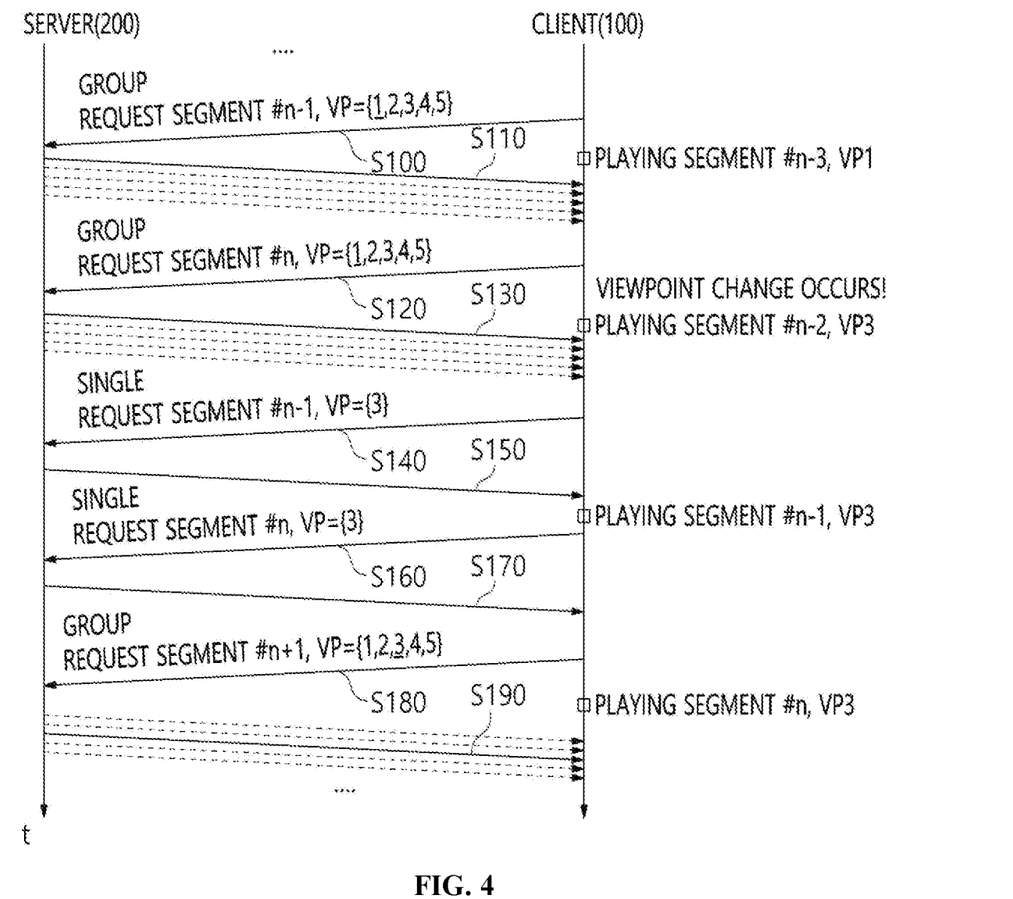
FIG. 4 is a flowchart illustrating a hybrid download method for multiview streaming according to an embodiment.

FIG. 4 is a flowchart illustrating a hybrid download method for multiview streaming according to an embodiment.

First, a client 100 may request a group download for an n−1-th segment from a server 200 at step S100. Because a viewpoint at which the current client is playing a video is VP1, the viewpoint VP1 in the group download is a viewpoint corresponding to high quality, and the remaining viewpoints are viewpoints corresponding to low quality.

Then, the client 100 may play an n−3-th segment at the viewpoint VP1. In response to the group download request made during a process in which a group download request for the n−1-th segment is made, the server 200 may complete an n−1-th group segment download at step S110.

Next, the client 100 may request a group download for an n-th segment from the server 200 at step S120.

When a change in the viewpoint of the viewer occurs at the time at which an n−2-th segment is played, the client 100 may sense the viewpoint change and immediately play a low-quality n−2-th segment at a viewpoint VP3. In response to the group download request made in a process in which the group download request for the n-th segment is performed, the server 200 may complete an n-th group segment download at step S130.

At step S140, the client 100 may request a single download for a high-quality n−1-th segment corresponding to the viewpoint VP3 at the same time that the n-th group segment download is completed.

The server 100 may provide a high-quality n−1-th single segment at the viewpoint VP3 in response to the single download request for a high-quality n−1-th segment corresponding to the viewpoint VP3 at step S150. The client 100 may play the high-quality n−1-th segment at the viewpoint VP3, which has been downloaded.

Because the group download, which is previously performed, is performed on segments up to the n-th segment, the client 100 may request a single download for the high-quality n-th segment corresponding to the viewpoint VP3 once more at step S160.

The server 200 may provide the high-quality n-th single segment corresponding to the viewpoint VP3 to the client 100 in response to the single download request for the high-quality n-th segment corresponding to the viewpoint VP3 at step S170.

After the single download has been completed, the client 100 may request a group download for a high-quality n+1-th segment corresponding to the viewpoint VP3 at step S180.

The client 100 may play the high-quality n-th segment at the viewpoint VP3, which has been downloaded. The server 200 may provide a high-quality n+1-th segment group corresponding to the viewpoint VP3 to the client 100 in response to a group download request for the high-quality n+1-th segment group corresponding to the viewpoint VP3 at step S190.

The hybrid download scheme according to the embodiment may change the viewpoint without causing a delay with respect to the viewpoint transition of the viewer, and may considerably reduce the transition time depending on the switching of video quality.

A hybrid download apparatus for multiview streaming according to an embodiment may be implemented in a computer system such as a computer-readable storage medium.

Figure 5:
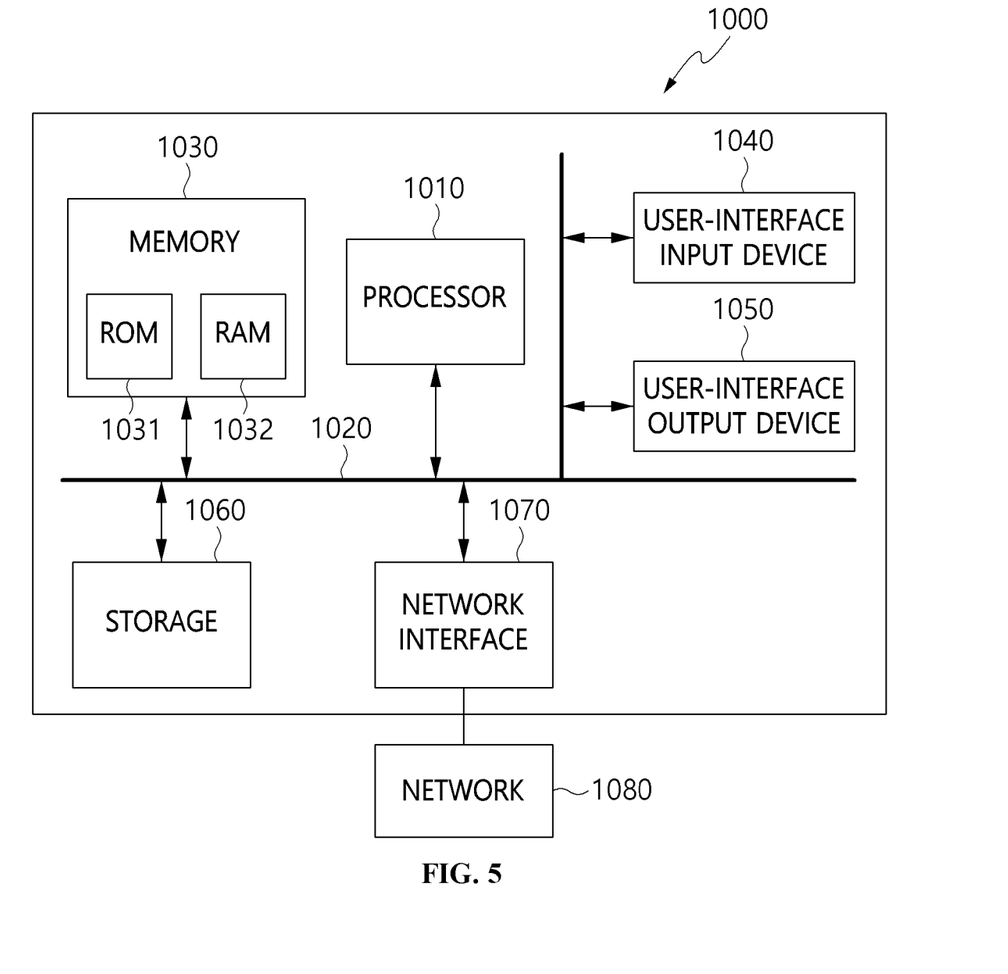
FIG. 5 is a block diagram illustrating the configuration of a computer system according to an embodiment.

FIG. 5 is a block diagram illustrating the configuration of a computer system according to an embodiment.

Referring to FIG. 5, a computer system 1000 according to an embodiment may include one or more processors 1010, memory 1030, a user interface input device 1040, a user interface output device 1050, and storage 1060, which communicate with each other through a bus 1020. The computer system 1000 may further include a network interface 1070 connected to a network 1080.

Each processor 1010 may be a Central Processing Unit (CPU) or a semiconductor device for executing programs or processing instructions stored in the memory 1030 or the storage 1060. The processor 1010 may be a kind of CPU, and may control the overall operation of the hybrid download apparatus for multiview streaming.

The processor 1010 may include all types of devices capable of processing data. The term processor as herein used may refer to a data-processing device embedded in hardware having circuits physically constructed to perform a function represented in, for example, code or instructions included in the program. The data-processing device embedded in hardware may include, for example, a microprocessor, a CPU, a processor core, a multiprocessor, an Application-Specific Integrated Circuit (ASIC), a Field-Programmable Gate Array (FPGA), etc., without being limited thereto.

The memory 1030 may store various types of data for the overall operation such as a control program for performing a hybrid download method for multiview streaming according to an embodiment. In detail, the memory 1030 may store multiple applications executed by the hybrid download apparatus for multiview streaming, and data and instructions for the operation of the hybrid download apparatus for multiview streaming.

Each of the memory 1030 and the storage 1060 may be a storage medium including at least one of a volatile medium, a nonvolatile medium, a removable medium, a non-removable medium, a communication medium, an information delivery medium or a combination thereof. For example, the memory 1030 may include Read-Only Memory (ROM) 1031 or Random Access Memory (RAM) 1032.

A server according to an embodiment may be implemented in a computer system such as a computer-readable storage medium. The configuration of the server may be identical to that of FIG. 5.

The particular implementations shown and described herein are illustrative examples of the present disclosure and are not intended to limit the scope of the present disclosure in any way. For the sake of brevity, conventional electronics, control systems, software development, and other functional aspects of the systems may not be described in detail. Furthermore, the connecting lines or connectors shown in the various presented figures are intended to represent exemplary functional relationships and/or physical or logical couplings between the various elements. It should be noted that many alternative or additional functional relationships, physical connections, or logical connections may be present in an actual device. Moreover, no item or component may be essential to the practice of the present disclosure unless the element is specifically described as "essential" or "critical".

Embodiments may minimize the time required for high-quality transition without causing a delay in viewpoint transition by solving the problem of a high-quality transition delay occurring in a group download.

Further, embodiments may improve the quality of user experience in a multiview video streaming service.

Therefore, the spirit of the present disclosure should not be limitedly defined by the above-described embodiments, and it is appreciated that all ranges of the accompanying claims and equivalents thereof belong to the scope of the spirit of the present disclosure.

What is claimed is:

1. A hybrid download method for multiview streaming, comprising:
 requesting a group download for an n−1-th segment from a server;
 playing an n−3-th segment at a viewpoint VP1 of a viewer;
 when a group download request for the n−1-th segment is completed, making a group download request for an n-th segment;
 when a change in a viewpoint of the viewer occurs at a time at which an n−2-th segment is played, playing a low-quality n−2-th segment at a viewpoint VP3;
 when the group download for the n-th segment is completed, requesting a single download for a high-quality n−1-th segment corresponding to the viewpoint VP3 from the server; and
 when the single download for the high-quality n−1-th segment corresponding to the viewpoint VP3 is completed, playing the high-quality n−1-th segment at the viewpoint VP3.

2. The hybrid download method of claim 1, further comprising:
 requesting a single download for a high-quality n-th segment corresponding to the viewpoint VP3 from the server.

3. The hybrid download method of claim 2, further comprising:
 when the single download for the high-quality n-th segment corresponding to the viewpoint VP3 is completed, requesting a group download for a high-quality n+1-th segment corresponding to the viewpoint VP3 from the server.

4. The hybrid download method of claim 3, further comprising:
 playing the high-quality n-th segment at the viewpoint VP3.

5. The hybrid download method of claim 4, further comprising:
 completing the group download for the high-quality n+1-th segment corresponding to the viewpoint VP3.

6. The hybrid download method of claim 1, wherein:
 when the viewpoint of the viewer is VP1, the viewpoint VP1 corresponds to high quality, and other viewpoints correspond to low quality.

7. A hybrid download apparatus for multiview streaming, comprising:
 a memory configured to store a control program for a hybrid download for multiview streaming; and
 a processor configured to execute the control program stored in the memory,
 wherein the processor is configured to request a group download for an n−1-th segment from a server, play an n−3-th segment at a viewpoint VP1 of a viewer, when a group download request for the n−1-th segment is completed, make a group download request for an n-th segment, when a change in a viewpoint of the viewer occurs at a time at which an n−2-th segment is played, play a low-quality n−2-th segment at a viewpoint VP3, when the group download for the n-th segment is completed, request a single download for a high-quality n−1-th segment corresponding to the viewpoint VP3 from the server, and when the single download for the high-quality n−1-th segment corresponding to the viewpoint VP3 is completed, play the high-quality n−1-th segment at the viewpoint VP3.

8. The hybrid download apparatus of claim 7, wherein the processor is configured to request a single download for a high-quality n-th segment corresponding to the viewpoint VP3 from the server.

9. The hybrid download apparatus of claim 8, wherein the processor is configured to, when the single download for the high-quality n-th segment corresponding to the viewpoint VP3 is completed, request a group download for a high-quality n+1-th segment corresponding to the viewpoint VP3 from the server.

10. The hybrid download apparatus of claim 9, wherein the processor is configured to play the high-quality n-th segment at the viewpoint VP3.

11. The hybrid download apparatus of claim 10, wherein the processor is configured to complete the group download for the high-quality n+1-th segment corresponding to the viewpoint VP3.

12. The hybrid download apparatus of claim 7, wherein, when the viewpoint of the viewer is VP1, the viewpoint VP1 corresponds to high quality and other viewpoints correspond to low quality.

13. A multiview streaming system, comprising:
 a client configured to request a segment group download and a segment single download; and
 a server configured to transmit a segment group and a single segment in response to the request,
 wherein the client is configured to request a group download for an n−1-th segment from a server, play an n−3-th segment at a viewpoint VP1 of a viewer, when a group download request for the n−1-th segment is completed, make a group download request for an n-th segment, when a change in a viewpoint of the viewer occurs at a time at which an n−2-th segment is played, play a low-quality n−2-th segment at a viewpoint VP3, when the group download for the n-th segment is completed, request a single download for a high-quality n−1-th segment corresponding to the viewpoint VP3 from the server, and when the single download for the high-quality n−1-th segment corresponding to the viewpoint VP3 is completed, play the high-quality n−1-th segment at the viewpoint VP3.

14. The multiview streaming system of claim 13, wherein the client is configured to request a single download for a high-quality n-th segment corresponding to the viewpoint VP3 from the server.

15. The multiview streaming system of claim 14, wherein the client is configured to, when the single download for the high-quality n-th segment corresponding to the viewpoint VP3 is completed, request a group download for a high-quality n+1-th segment corresponding to the viewpoint VP3 from the server.

16. The multiview streaming system of claim 15, wherein the client is configured to play the high-quality n-th segment at the viewpoint VP3.

17. The multiview streaming system of claim 16, wherein the client is configured to complete the group download for the high-quality n+1-th segment corresponding to the viewpoint VP3.

18. The multiview streaming system of claim 13, wherein, when the viewpoint of the viewer is VP1, the viewpoint VP1 corresponds to high quality and other viewpoints correspond to low quality.

\* \* \* \* \*